United States Patent
McKay

(10) Patent No.: US 10,591,096 B2
(45) Date of Patent: Mar. 17, 2020

(54) MECHANICAL SEAL ASSEMBLY

(71) Applicant: EVENORT LTD, Sheffield (GB)

(72) Inventor: Craig McKay, Sheffield (GB)

(73) Assignee: EVENORT LTD, Sheffield (GB)

( * ) Notice: Subject to any disclaimer, the term of this patent is extended or adjusted under 35 U.S.C. 154(b) by 116 days.

(21) Appl. No.: 15/574,441

(22) PCT Filed: May 13, 2016

(86) PCT No.: PCT/GB2016/000099
§ 371 (c)(1),
(2) Date: Nov. 15, 2017

(87) PCT Pub. No.: WO2016/185157
PCT Pub. Date: Nov. 24, 2016

(65) Prior Publication Data
US 2018/0142817 A1 May 24, 2018

(30) Foreign Application Priority Data
May 15, 2015 (GB) .................................. 1508432.0

(51) Int. Cl.
*F16L 23/20* (2006.01)
*F16L 17/08* (2006.01)
(Continued)

(52) U.S. Cl.
CPC .............. *F16L 23/20* (2013.01); *F16L 17/08* (2013.01); *F16L 23/02* (2013.01); *F16J 15/08* (2013.01)

(58) Field of Classification Search
CPC ...... F16J 15/08; F16J 15/0881; F16J 15/0887; F16J 15/0893; F16J 15/02; F16J 15/062; F16J 15/064; F16L 23/22; F16L 19/0218
See application file for complete search history.

(56) References Cited

U.S. PATENT DOCUMENTS 1,703,696 A * 2/1929 Stratford ............. F16L 19/0218
285/334.4
1,825,962 A * 10/1931 Laird ................... F16J 15/0887
220/378
(Continued)

FOREIGN PATENT DOCUMENTS

CN 202327443 U 7/2012
DE 3105395 A1 11/1982
(Continued)

OTHER PUBLICATIONS

International Search Report issued in PCT/GB2016/000099 dated Aug. 22, 2016 (2 pages).
(Continued)

*Primary Examiner* — Kristina R Fulton
*Assistant Examiner* — L. Susmitha Koneru
(74) *Attorney, Agent, or Firm* — Osha Liang LLP

(57) ABSTRACT

A method for providing a mechanical seal assembly involves the steps of: providing first and second flanges (10) of standard configuration; providing a metallic seal element (32) having first and second faces, wherein each face includes an annular seal surface (42); and modifying each of said first and second flanges in order to produce a new metallic seal surface (28); wherein the annular seal surface (32) on each of the first and second faces of the metallic seal element is complimentary to the new metallic seal surfaces (28) of the respective first and second flanges for sealing engagement therewith.

14 Claims, 5 Drawing Sheets

(51) Int. Cl.
*F16L 23/02* (2006.01)
*F16J 15/08* (2006.01)

(56) References Cited

U.S. PATENT DOCUMENTS

| | | | | |
|---|---|---|---|---|
| 1,873,855 A | * | 8/1932 | Wilson | F16L 23/20 220/327 |
| 2,291,709 A | * | 8/1942 | Goetze | F16J 15/008 277/614 |
| 3,815,779 A | * | 6/1974 | Ludwig | F16L 23/006 220/89.2 |
| 4,019,371 A | * | 4/1977 | Chaplin | G01M 3/2861 73/46 |
| 4,303,251 A | | 12/1981 | Harra et al. | |
| 4,494,762 A | * | 1/1985 | Geipel | F16L 23/20 277/614 |
| 5,135,266 A | * | 8/1992 | Bridges | E21B 33/0422 285/123.12 |
| 5,829,794 A | * | 11/1998 | Schulz-Hausmann | F16L 23/036 285/205 |
| 2011/0253667 A1 | | 10/2011 | Hiss | |
| 2015/0021863 A1 | | 1/2015 | Wang | |

FOREIGN PATENT DOCUMENTS

| | | |
|---|---|---|
| EP | 1908998 A1 | 4/2008 |
| EP | 1909000 A1 | 4/2008 |
| GB | 782360 A | 9/1957 |
| GB | 1558857 A | 1/1980 |
| GB | 2253645 A | 9/1992 |
| WO | 93/18331 A1 | 9/1993 |

OTHER PUBLICATIONS

Written Opinion of the International Searching Authority issued in PCT/GB2016/000099 dated Aug. 22, 2016 (9 pages).
Combined Search and Examination Report issued in corresponding GB Application No. 1508432.0 dated Nov. 5, 2015 (8 pages).
Examination Report issued in corresponding GB Application No. 1508432.0 dated Apr. 24, 2017 (4 pages).
Notification of Grant issued in corresponding GB Application No. 1508432.0 dated Oct. 3, 2017 (2 pages).

* cited by examiner

MECHANICAL SEAL ASSEMBLY

The present invention relates to a mechanical seal assembly, in particular a mechanical seal assembly for providing a metal-to-metal seal within a flanged connection.

Flanges are widely used for connecting two pipes together, or when connecting a pipe to a valve, pump and other auxiliary device for controlling or monitoring flow within a flow line, for example.

A wholly conventional flange takes the form of a flange body having first and second ends and a fluid bore of circular cross section extending between the first and second ends. A first end of the fluid bore is exposed at the first end of the flange body, and the first end of the flange body is of larger diameter than the second end of the flange body, defining a flange connection face concentric with the fluid bore. A plurality of bolt holes are provided through the first end, off-set from the fluid bore and extending in a direction parallel with the central axis of the fluid bore.

When connecting two pipes together, a flanged joint can be made by bolting together two flanges, with a gasket clamped between them to provide a pressure seal. When connecting a pipe to a valve, pump and other auxiliary device (e.g. for controlling or monitoring flow within a flow line), the auxiliary device will typically a flanged connection face configured for bolted connection with the flange connection face of a conventional flange, with a gasket clamped between the flanged connection face of the auxiliary device and the flange connection face of the conventional flange.

Conventional flanges are approved for use under certain pressure and/or temperature conditions according to one or more widely recognised standards, such as the American National Standards Institute (ANSI). Depending on the material the flange is made from, such as cast iron or steel, and the type of connection required to attach the flange to a pipe (e.g. via a welded or threaded connection), standard class ratings are determined, such as to provide a pressure/temperature rating or required bolt and nut dimensions etc.

In the oil and gas industry, for example, flanges are expected to withstand high pressures and the ANSI standards provide consumers with important information on the characteristics and performance of the flange, as well as an assurance that they are receiving the right product for their particular application.

The ANSI B16.5 pipe flanges are rated from Class 150 through to Class 2500 which allow for hydrostatic test pressures ranging from 400 psi (2.76 MPa) up to just under 10,000 psi (68.95 MPa).

As the operating pressure of a pipeline incorporating a flanged joint increases, more force is required to compress the gasket and contain the force acting on the seal. This requirement drives the size and complexity of the bolt configuration, thus necessitating a larger flange to accommodate the bolting requirements at higher pressures.

For example, a Standard 2 inch Class 150 flange will have an outside diameter of 6 inches (152.40 mm) and a thickness of 0.75 inches (19.05 mm), while a Standard 2 inch Class 2500 flange will have an outside diameter of 9.25 inches (234.95 mm) and a thickness of 2 inches (50.80 mm). In addition, the bolt requirement doubles from 4 bolts to 8 bolts, the diameter of the required bolts increases from 0.625 inches (15.88 mm) to 1 inch (25.4 mm), and the applied torque increases from 80 Ft/lbs (108.47 Nm) to 300 Ft/lbs (406.75 Nm).

The large diameter and thickness of the Class 2500 flange is required simply to accommodate the 8 large bolts required to meet the recommended torque. Customers are therefore paying a huge amount of money for material consumed in the production of a flanged product in order to accommodate higher pressure uses. The opportunity for unnecessary waste and associated cost is multiplied considerably when dealing with more expensive grades of material, such as alloy 625, which is 10 times more expensive than regular stainless steel. In addition, there are further costs associated with the packaging, transportation and installation of goods that are larger and/or heavier than they need to be, as well as the obvious health and safety implications.

There is therefore a need for improved flange solutions which reduces or eliminates the effect of one or more of the issues identified above.

According to a first aspect of the invention, there is provided a method of providing a mechanical seal assembly, the method comprising: providing first and second flanges of standard configuration, each of the kind comprising a flange body having first and second ends and a fluid bore of circular cross section extending between the first and second ends, wherein a first end of the fluid bore is exposed at the first end of the flange body, wherein the first end of the flange body is of larger diameter than the second end of the flange body and defines a flange connection face concentric with the fluid bore, and wherein a plurality of bolt holes are provided through said first end, off-set from the fluid bore and extending in a direction parallel with the central axis of the fluid bore; providing a metallic seal element, said metallic seal element comprising a circular band having first and second faces and a central bore; wherein each of the first and second faces of said metallic seal element includes an annular seal surface concentric with said central bore; the method further comprising: modifying each of said first and second flanges, in order to produce a new metallic seal surface adjacent the flange connection face thereof, concentric with said central axis, wherein the annular seal surface on each of the first and second faces of said metallic seal element is complimentary to the new metallic seal surfaces of the respective first and second flanges for sealing engagement therewith; and creating metal-to-metal seals between said metallic seal element and said first and second flanges, by locating the metallic seal element between said first and second flanges, such that each annular seal surface of said metallic seal element engages a respective metallic seal surface of one of said first and second flanges, and then using bolts extending through the flange connection faces of said first and second flanges, in order to secure the first and second flanges together and bring about sealing engagement between the annular seal surfaces of the metallic seal element and the metallic seal surfaces of said first and second flanges.

The method of the invention has been found to produce a mechanical seal assembly that is capable of operating under conditions significantly above the rated value for the standard configurations of flange. Accordingly, the method of the invention makes it possible to significantly increase the operational capacity for a given standard flange configuration. In turn, this makes it possible to reduce the overall weight and diameter that is necessary for a flanged joint in specific high pressure applications. This has multiple benefits, for example in terms of costs savings (e.g. for production, transportation, installation etc.), as well as in terms of reducing health & safety risks associated with dealing with larger/heavy apparatus.

In exemplary embodiments, the first and/or second flange body is connected to or connectable to a pipe, e.g. by a weld or a screw thread.

In exemplary said first and second flanges are each machined to provide said metallic seal surface concentric with said central axis.

In exemplary embodiments said metallic seal surface extends at an angle to said central axis.

In exemplary embodiments said metallic seal surface extends from a first diameter at said flange connection face to a second diameter at a depth within the flange body, wherein the first diameter is greater than the second diameter.

In exemplary embodiments the flange connection face is part of an upstand at a first end of the flange body, and wherein at least part of the metallic seal surface is formed by removing material from said upstand.

In exemplary embodiments, a shoulder is formed between the metallic seal surface and an internal wall of the fluid bore on each flange.

In exemplary embodiments, the shoulder is located at a depth from the flange connection face of each flange suitable to ensure that the seal element is spaced therefrom when the seal element is arranged in sealing engagement between the first and second flanges.

Advantageously, the invention also provides a mechanical seal assembly comprising:

two flanges, each flange comprising a flange body having first and second ends and a fluid bore of circular cross section extending between the first and second ends, wherein a first end of the fluid bore is exposed at the first end of the flange body, wherein the first end of the flange body is of larger diameter than the second end of the flange body and defines a flange connection face concentric with the fluid bore, and wherein a plurality of bolt holes are provided through the first end, off-set from the fluid bore and extending through in a direction parallel with the central axis of the fluid bore;

a metallic seal element comprising a circular band having first and second faces and a central bore; wherein each of the first and second faces of said metallic seal element includes an annular seal surface concentric with said central bore;

wherein each of said first and second flanges includes a metallic seal surface adjacent the flange connection face thereof, concentric with said central axis, the metallic seal surface extending between said flange connection face and said fluid bore;

wherein the annular seal surface on each of the first and second faces of said metallic seal element is complimentary to the said metallic seal surfaces of the respective first and second flanges, for sealing engagement therewith; and further wherein the metallic seal element is located between said first and second flanges, such that each annular seal surface of said metallic seal element is engaged with the metallic seal surface of a respective one of said first and second flanges, and bolts extend through the flange connection faces of said first and second flanges, in order to secure the first and second flanges together and provide sealing engagement between the annular seal surfaces of the metallic seal element and the metallic seal surfaces of said first and second flanges.

The invention also has application in the provision of a metal-to-metal seal between a single flange of standard configuration (of the kind set forth) and an auxiliary device having a flanged connection face configured for bolted connection with a flange of standard configuration. In such applications, it will be understood that the flanged connection face of the auxiliary device will already include a seat surface for use in clamping a gasket between the flanged connection face of the auxiliary device and the flange connection face of the flange of standard configuration. Accordingly, the method of the invention can be modified, so that a new metallic seal surface is provided in the flange connection face of the standard flange (in the manner already set forth), as well as in the seat surface of the auxiliary device. The metallic seal element will therefore be designed so that the annular seal surface on one face thereof is complimentary to the new metallic seal surface of the modified standard flange, and so that the annular seal surface on the other face thereof is complimentary to the new metallic seal surface of the modified auxiliary device. Metal-to-metal seals can then be created between said metallic seal element and the modified standard flange and auxiliary device, by arranging the metallic seal element so that each annular seal surface of said metallic seal element engages with a new metallic seal surface of a respective one of said modified standard flange and auxiliary device, and then using bolts or the like to secure the assembly together and bring about sealing engagement between the annular seal surfaces of the metallic seal element and the new metallic seal surfaces of said modified standard flange and auxiliary device.

A standard flange of the kind set forth means a flange of known configuration in the art, comprising a flange body having first and second ends and a fluid bore of circular cross section extending between the first and second ends, wherein a first end of the fluid bore is exposed at the first end of the flange body, wherein the first end of the flange body is of larger diameter than the second end of the flange body and defines a flange connection face concentric with the fluid bore, and wherein a plurality of bolt holes are provided through the first end, off-set from the fluid bore and extending in a direction parallel with the central axis of the fluid bore.

Although the illustrated embodiments herein have been designed using ANSI B16.5 as the baseline geometry, the invention clearly applies to any range of flange family defined by an international standard using traditional raised face or RTJ compressed gaskets. Such families will include different sizes of flange grouped by pressure rating and having increasingly large and complex bolting configurations as the pressure range increases. The following are typical examples of international standards for flanges to which the invention will have applicability: ANSI B16.5, ANSI B16.47, BS3293, BS1560, EN1092, BS4504, DIN SERIES, NFE SERIES, API FLANGES, BS10, JIS, and ISO 7005.

As mentioned above, a single flange can be used to create a seal with an auxiliary device having a flanged connection face (i.e. configured for bolted connection and communication with the first end of the flange), by clamping a metallic seal element therebetween. A wide range of OEM auxiliary devices can be modified to take advantage of the enhanced performance, reduced weight and simplified bolting arrangements that the invention facilitates, particularly those made for flanged connection incorporating standard flange geometry derived from ANSI B16.5 (or any other international standard), integral or otherwise. Examples of OEM manufacturer currently active in producing such devices include Flexsteel pipe, Swagelok, Parker Hannifin, Rosemount, Emerson, Oliver Valves, President Engineering, Weir, Adanac, Cameron, Schlumberger, Shipham, Schnieder, Alco Hi Tech, Endress and Hauser. AES Seal, and Rotorke. Examples of the kind of auxiliary device to which the invention can be applied include valve products such as ball valves, gate valves, globe valves, diaphragm and pinch valves, plug and ball valves, butterfly valves, needle valves, as well as specifically designed products such as process interface and instrumentation valves, valve products such as mono flanges and block & bleed valves. Further specific examples of OEM product include Parker Pro Bloc, Alco Sub Star needle valves, Swagelok mono flanges or block & bleed valves. The invention will also have application in pressure, level and flow products (wireless or otherwise), such as Rosemount Tank Radar products and British Rototherm products.

Further advantageous features or aspects of the invention are set out in the dependent claims, and/or will be apparent from the following description of embodiments, made by way of example with reference to the accompanying drawings, in which:

The preceding discussion of the background to the invention is intended only to facilitate an understanding of the invention. It should be appreciated that the discussion is not an acknowledgement or admission that any of the material referred to was part of the common general knowledge as at the priority date of the application.

Throughout the description and claims of this specification, the words "comprise" and "contain" and variations of the words, for example "comprising" and "comprises", mean "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics, and compounds described in conjunction with a particular aspect, embodiment or example of the invention are to be understood to be applicable to any other aspect, embodiment or example described herein unless incompatible therewith.

The figures are not necessarily to scale.

Figure 1:
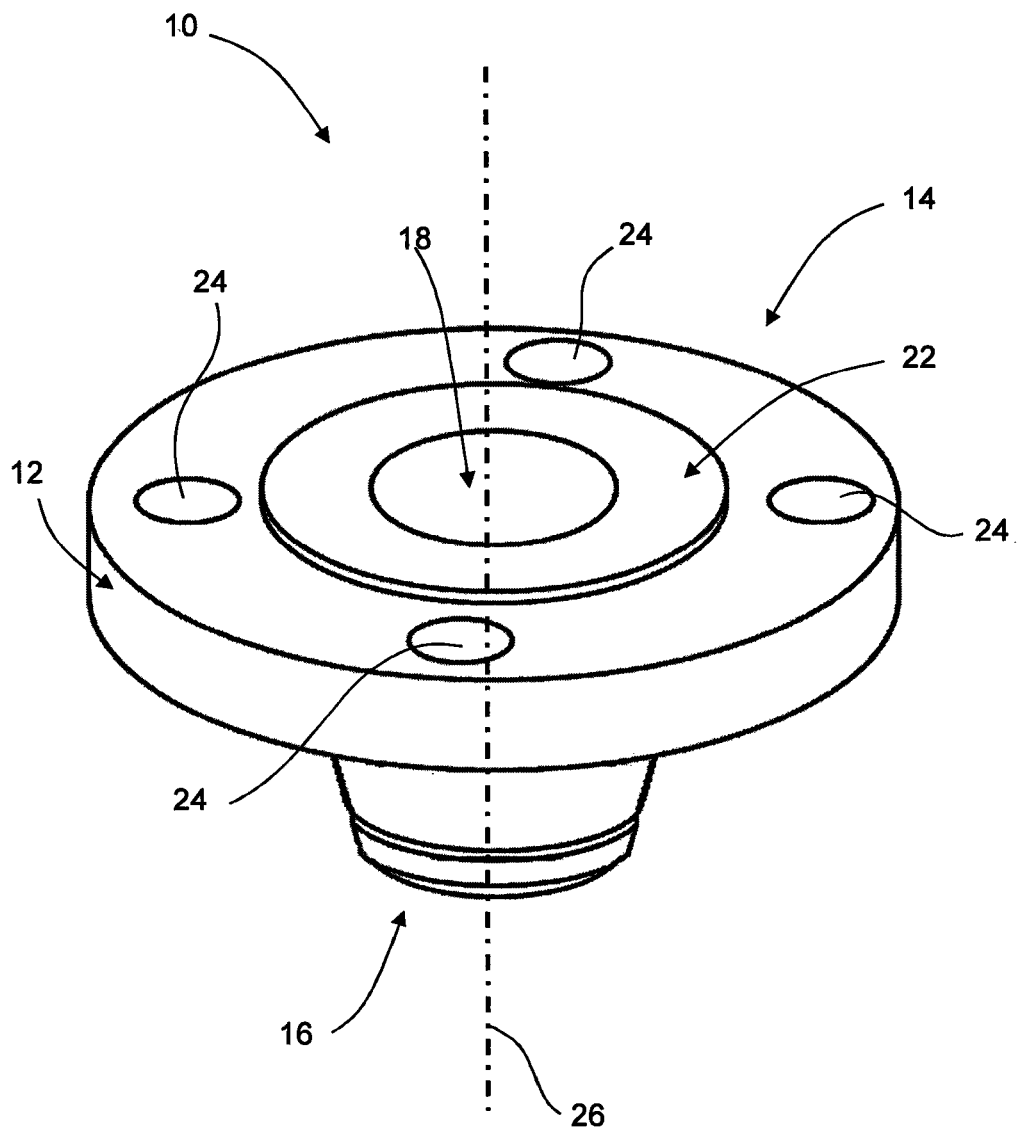
FIG. 1 is a perspective view of a conventional weld neck flange.

Referring now to FIG. 1, a flange of standard configuration in the art is shown at 10. Accordingly, the flange 10 takes the form of a flange body 12 having first and second ends 14, 16 and a fluid bore 18 of circular cross section extending between the first and second ends 14, 16. A first end of the fluid bore 18 is exposed at the first end 14 of the flange body 12. The first end 14 of the flange body 12 is of larger diameter than the second end 16, and defines a flange connection face 22 concentric with the fluid bore 18. A plurality of bolt holes 24 are provided through the first end of the flange body 12, off-set from the fluid bore 18 and extending in a direction parallel with a central axis 26 of the fluid bore 18.

The illustrated embodiment is based on standard ANSI B16.5 geometry, wherein the flange connection face 22 is part of an upstand at the first end of the body 12 and extends in a direction orthogonal to the central axis 26.

Figure 2:
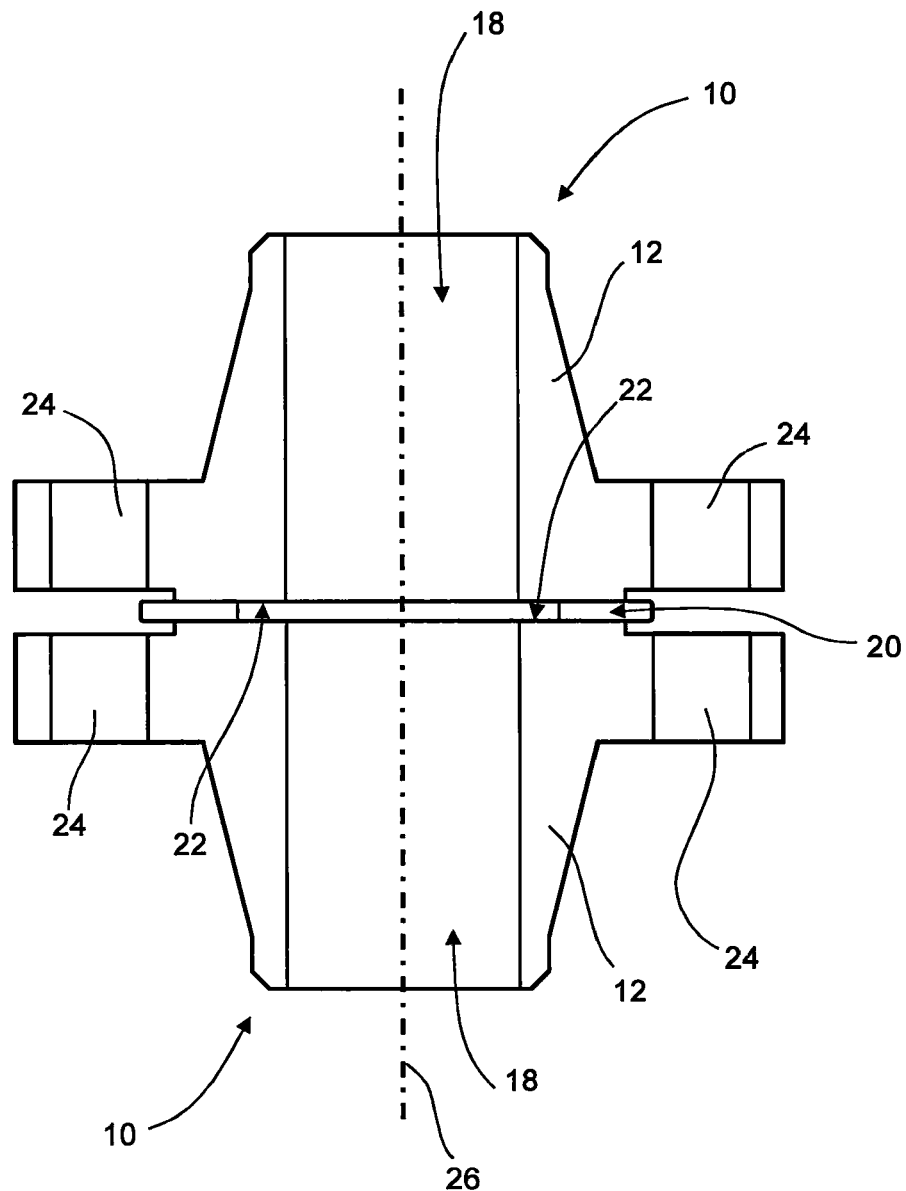
FIG. 2 is a perspective view of a conventional weld neck flange sealing assembly, incorporating a gasket and the weld neck flange of FIG. 1.

It will be understood that a conventional flanged joint can be made by bolting together two standard flanges 10, with a gasket 20 clamped between the flange connection faces 22 of the two flanges 10 to provide a pressure seal, e.g. as indicated in FIG. 2. However, it has been found that the rated values for any given standard flange can be safely and significantly exceeded, if the flanges are modified in accordance with the following method, described with respect to FIGS. 3 to 5.

Firstly, each flange 10 is modified, in order to produce a new metallic seal surface 28 adjacent the flange connection face 22, concentric with the central axis 26. This can be achieved by machining into each flange connection face 22, to provide said metallic seal surface 28 concentric with said central axis, e.g. by creating a chamfer or other angled transition between the flange connection face 22 and the fluid bore 18.

Figure 3:
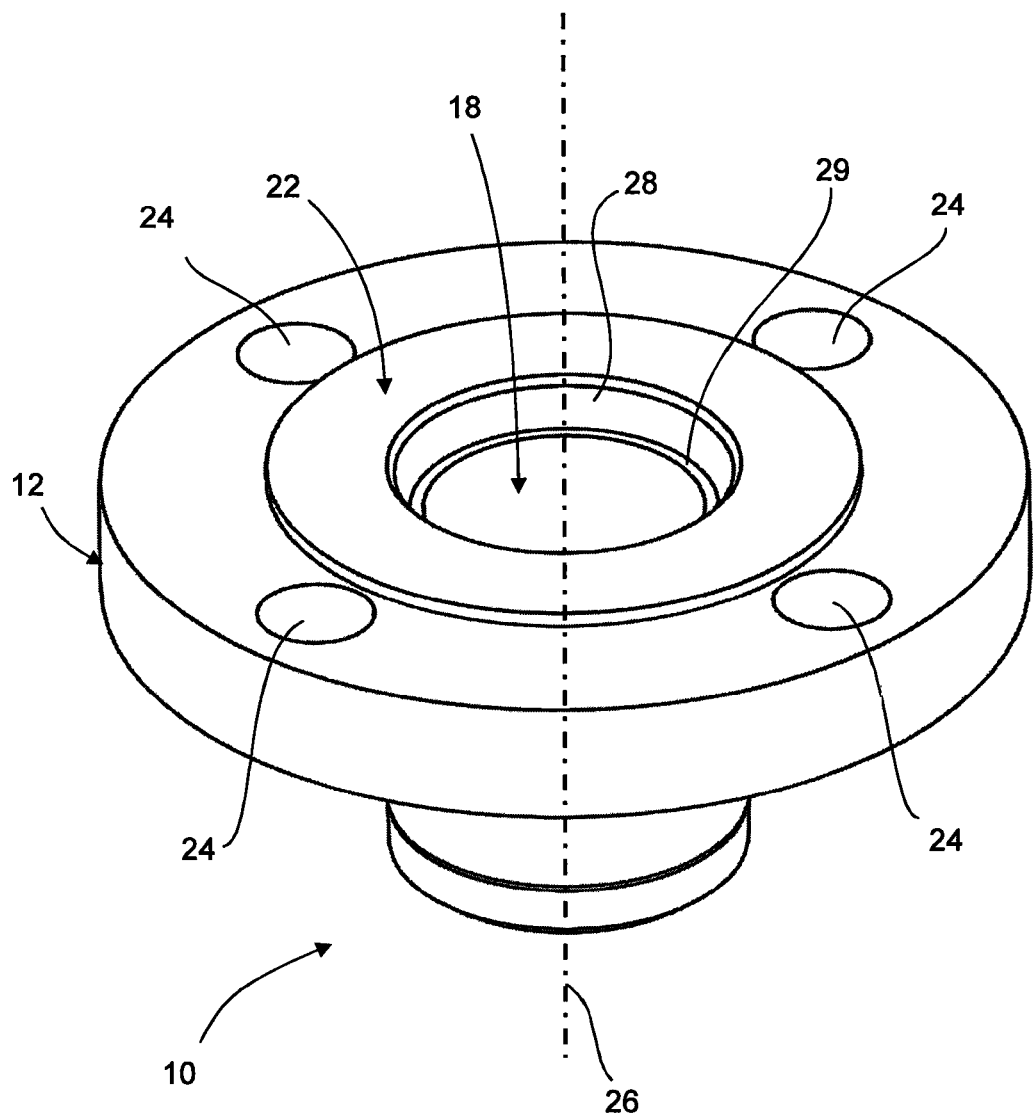
FIG. 3 is a cross-section through a modified weld neck flange.

In exemplary embodiments (as illustrated in FIG. 3), the metallic seal surface 28 extends at an angle to the central axis 26 of the flange body 12 and to the flange connection face 22. In the embodiment of FIG. 3, at least a part of the metallic seal surface 28 is formed by removing material from the upstand at the first end of the body 12.

In exemplary embodiments (as illustrated in FIG. 3), the metallic seal surface 28 extends at an angle to the central axis 26 of the fluid bore 18, from a first diameter at said flange connection face 22 to a second diameter at a depth within the flange body 12 (i.e. spaced from the flange connection face 22), wherein the first diameter is greater than the second diameter.

In exemplary embodiments (as illustrated in FIG. 3), a shoulder is provided at a transition between the metallic seal surface 28 and an internal wall 30 of the fluid bore 18. The shoulder 29 is concentric with the central axis 26 of the body 12. In exemplary embodiments, the shoulder 29 extends radially, e.g. parallel with the flange connection face 22.

A metallic seal element 32 is then provided, as shown in FIG. 3. The metallic seal element 32 takes the form of a circular band having first and second faces 36, 38 and a central bore 40 extending therethrough. Each of the first and second faces 36, 38 includes an annular seal surface 42 concentric with the central bore 40. In preferred embodiments, each of the annular seal surfaces 42 of the metallic seal element 32 are part of a lip, nose or other projection extending from a respective face of the metallic seal element, and intended to be energised (e.g. by elastic deformation thereof) in order to bring about a satisfactory metal-to-metal seal with each of the flanges 10. In the illustrated embodiment, the metallic seal element can be said to define a cone projecting from each of said faces, wherein each annular seal surface 42 is defined by an outer surface of a respective cone.

The metallic seal element 32 is designed such that the annular seal surface 42 on each of the first and second faces 36, 38 is generally complimentary to the new metallic seal surfaces 28 of a respective one of the two flanges 10. If the flanges 10 are identical, the new metallic seal surfaces 28 may be of identical shape and configuration.

Figure 4:
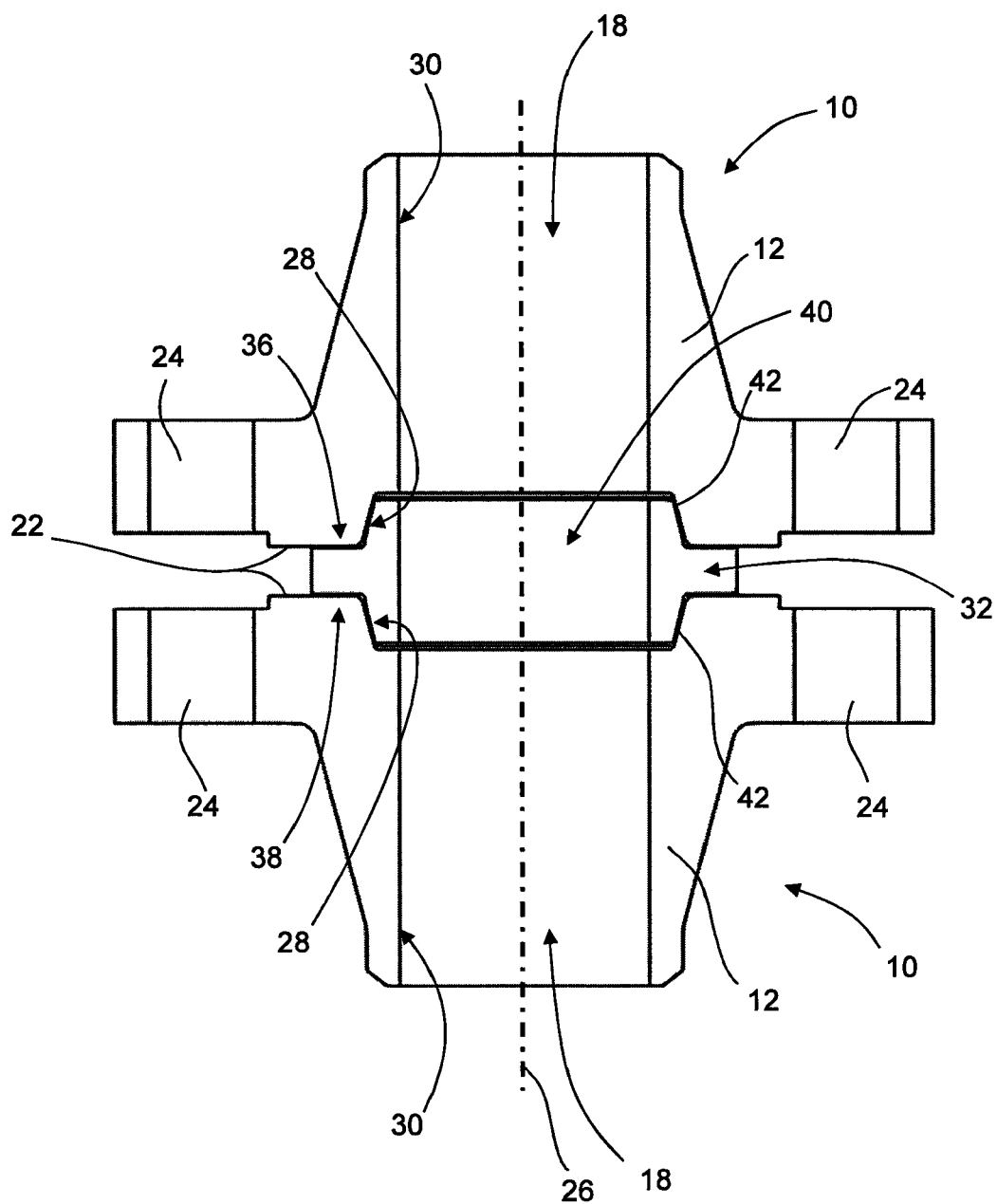
FIG. 4 is a cross-section through a modified weld neck flange sealing assembly, incorporating a metal sealing ring and a modified weld neck flange of FIG. 3.

Metal-to-metal seals can then be created between the metallic seal element 32 and the two flanges 10, by locating the metallic seal element 32 between the two flanges 10, such that each annular seal surface 42 engages with the new metallic seal surface of a respective one of said two flanges 10, as shown in FIG. 4. Bolts (not shown) can then be used to secure the two flanges 10 together and bring about sealing engagement between the annular seal surfaces 42 and the new metallic seal surfaces 28. The seal surface 42 is configured for energisation (e.g. by elastic deformation) under load (e.g. when the first and second flanges 10 are bolted together through bolt holes 24 aligned in the position shown in FIG. 4).

In the illustrated embodiment, the shoulder 29 is located at a depth from the flange connection face 22 suitable to ensure that the seal element 32 is spaced therefrom when the seal surface 42 on the seal element 32 is in sealing engagement with a respective seal surface on the flange 10.

In the illustrated embodiment, the seal element 32 is configured so that the central bore 40 conforms at least substantially to the dimensions of the fluid bore 18 of the flanges 10, in order to provide fully flush bore operating conditions between the two flanges 10, in use, thereby reducing flow inefficiencies. This contrasts with conventional gasket arrangements, where the gasket bore typically has a much greater diameter than the fluid bore on each flange forming the sealed connection.

In exemplary embodiments, the first and/or second flange body 12 is connected to or connectable to a pipe, e.g. by a weld or a screw thread.

Figure 5:
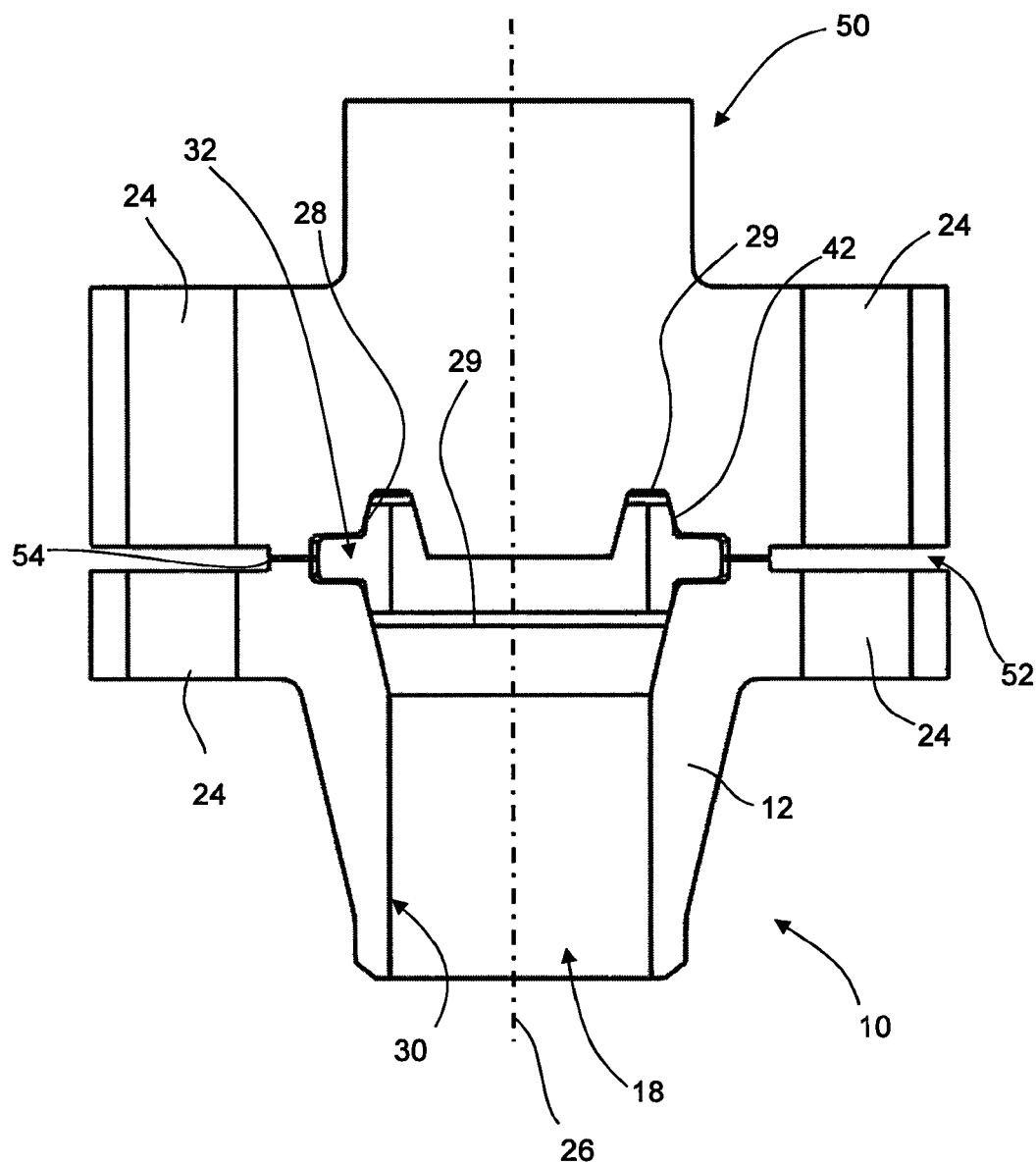
FIG. 5 is similar to FIG. 4, showing a cross-section through a variant weld neck flange sealing assembly, incorporating the modified weld neck flange of FIG. 3.

It will be understood that the flanges 10 in FIGS. 1 to 4 are of the kind known as weld neck flanges. However, the invention has application for other types of flange or device having a flanged connection face. An example of such a device is illustrated in FIG. 5, wherein the device 50 has a flanged connection face 52 configured for bolted connection with a flange of standard configuration. In such applications, it will be understood that the flanged connection face 52 of the auxiliary device will already include a seat surface 54 for use in clamping a conventional gasket between the flanged connection face 52 of the auxiliary device and the flange connection face. 22 of the standard flange. Accordingly, the method of the invention can be modified, so that a new metallic seal surface (e.g. of the kind shown in FIG. 2) is provided in the flange connection face 22 of the standard flange 10 (e.g. in the manner already set forth), as well as in the flanged connection face 52 of the auxiliary device 50. The metallic seal element 32 will therefore be designed so that the annular seal surface 42 on one face thereof is complimentary to the new metallic seal surface 28 of the modified standard flange 10, and further so that the annular seal surface 42 on the other face thereof is complimentary to the new metallic seal surface 28 of the modified auxiliary device 50. Metal-to-metal seals can then be created between said metallic seal element and the modified standard flange and auxiliary device, by arranging the metallic seal element so that each annular seal surface of said metallic seal element engages with a new metallic seal surface of a respective one of said modified standard flange and auxiliary device, and then by using bolts via the bolt holes 24, to secure them together and bring about sealing engagement.

Again, a shoulder 29 may be provided on the auxiliary device, located at a depth from the connection face 54 suitable to ensure that the seal element 32 is spaced therefrom when the seal surface 42 on the seal element 32 is in sealing engagement with the seal surface 28 on the device 50.

In exemplary embodiments, the metallic seal element is made from carbon steel, stainless steel or nickel alloy material. In exemplary embodiments, the material should have mechanical properties suitable to provide a suitable yield strength for the pressures intended, as well as providing suitable corrosion resistance (since the seal element will be in contact with a working fluid, in use).

In exemplary embodiments, the flange is made from carbon steel, stainless steel or nickel alloy material.

Although the illustrated flange embodiments have been designed using ANSI B16.5 as the baseline geometry, the invention clearly applies to any range of flange family defined by an international standard using traditional raised face or RTJ compressed gaskets. Such families will include different sizes of flange grouped by pressure rating and having increasingly large and complex bolting configurations as the pressure range increases. The following are typical examples of international standards for flanges to which the invention will have applicability: ANSI B16.5, ANSI B16.47, BS3293, BS1560, EN1092, BS4504, DIN SERIES, NFE SERIES, API FLANGES, BS10, JIS, and ISO 7005.

The invention claimed is:

1. A method of providing a mechanical seal assembly, the method comprising:

providing first and second flanges each comprising a flange body having first and second ends and a fluid bore of circular cross section extending between the first and second ends,
wherein a first end of the fluid bore is exposed at the first end of the flange body,
wherein the first end of the flange body is of larger diameter than the second end of the flange body and defines a flange connection face concentric with the fluid bore,
wherein said flanged connection face is part of an upstand at said first end of the flange body,
wherein a plurality of bolt holes are provided through said first end of the flange body, off-set from the fluid bore and extending in a direction parallel with a central axis of the fluid bore; and
wherein said first end of the flange body defines a first planar surface and wherein said upstand projects from said first planar surface in a direction parallel to said central axis and away from said second end of the flange body, such that the flange connection face defines a second planar surface, wherein the second planar surface is spaced axially from the first planar surface;

providing a metallic seal element, said metallic seal element comprising a circular band having first and second faces and a central bore, wherein each of the first and second faces of said metallic seal element includes an annular seal surface concentric with said central bore;

modifying each of said first and second flanges, in order to produce a metallic seal surface adjacent the flange connection face thereof, concentric with said central axis, wherein the annular seal surface on each of the first and second faces of said metallic seal element is complimentary to the new metallic seal surfaces of the respective first and second flanges for sealing engagement therewith; and creating metal-to-metal seals between said metallic seal element and said first and second flanges, by locating the metallic seal element between said first and second flanges, such that each annular seal surface of said metallic seal element engages a respective metallic seal surface of one of said first and second flanges, and then using bolts extending through the flange connection faces of said first and second flanges, in order to secure the first and second flanges together and bring about sealing engagement between the annular seal surfaces of the metallic seal element and the metallic seal surfaces of said first and second flanges, wherein each of the first and second flanges is modified by machining said flanges to provide said metallic seal surface concentric with said central axis, wherein at least part of the metallic seal surface is formed by removing material from a respective one of said upstands, wherein said metallic seal surface extends at an angle to said central axis and extends from a first diameter at said flange connection face to a second diameter at a depth within the flange body, wherein the first diameter is greater than the second diameter, and wherein each flange includes a shoulder orthogonal to said central axis extending between the metallic seal surface and an internal wall of the fluid bore on each flange, said shoulder being located at a depth from the flange connection face of each flange suitable to ensure that the seal element is spaced therefrom when the seal element is arranged in sealing engagement between the first and second flanges.

2. The method according to claim 1, wherein the seal element is configured such that the seal element is spaced from the shoulder when the seal element is arranged in sealing engagement between the first and second flanges.

3. The method according to claim 1, wherein the seal element is configured so that the central bore thereof conforms at least substantially to the dimensions of the fluid bore of the first and second flanges.

4. The method according to claim 1, wherein each of the annular seal surfaces of the metallic seal element are part of a cone, lip, nose or other projection extending from a respective face of the metallic seal element.

5. The method according to claim 1, wherein said first and/or second flange is a weld neck flange.

6. The method according to claim 2, wherein said first and/or second flange is a weld neck flange.

7. The method according to claim 2, wherein the seal element is configured so that the central bore thereof conforms at least substantially to the dimensions of the fluid bore of the first and second flanges.

8. The method according to claim 2, wherein each of the annular seal surfaces of the metallic seal element are part of a cone, lip, nose or other projection extending from a respective face of the metallic seal element.

9. The method according to claim 3, wherein each of the annular seal surfaces of the metallic seal element are part of a cone, lip, nose or other projection extending from a respective face of the metallic seal element.

10. The method according to claim 3, wherein said first and/or second flange is a weld neck flange.

11. The method according to claim 4, wherein said first and/or second flange is a weld neck flange.

12. The method according to claim 7, wherein said first and/or second flange is a weld neck flange.

13. The method according to claim 8, wherein said first and/or second flange is a weld neck flange.

14. The method according to claim 9, wherein said first and/or second flange is a weld neck flange.

\* \* \* \* \*